United States Patent
Williamson et al.

(10) Patent No.: US 8,332,885 B2
(45) Date of Patent: Dec. 11, 2012

(54) SYSTEM AND METHOD FOR CONTENT DELIVERY WITH MULTIPLE EMBEDDED MESSAGES

(75) Inventors: Louis Williamson, Denver, CO (US); Steven Riedl, Superior, CO (US)

(73) Assignee: Time Warner Cable Inc., New York, NY (US)

( * ) Notice: Subject to any disclaimer, the term of this patent is extended or adjusted under 35 U.S.C. 154(b) by 486 days.

(21) Appl. No.: 12/250,686

(22) Filed: Oct. 14, 2008

(65) Prior Publication Data

US 2010/0095323 A1 Apr. 15, 2010

(51) Int. Cl.
*H04N 7/025* (2006.01)
(52) U.S. Cl. .............. 725/32; 725/36; 725/86; 725/87; 348/460
(58) Field of Classification Search ............ 725/32, 725/89, 86, 87
See application file for complete search history.

(56) References Cited

U.S. PATENT DOCUMENTS

| | | | |
|---|---|---|---|
| 7,382,796 B2 | 6/2008 | Haberman | |
| 7,490,344 B2 | 2/2009 | Haberman | |
| 7,657,428 B2 | 2/2010 | Haberman | |
| 2001/0032333 A1 | 10/2001 | Flickinger | |
| 2002/0056093 A1 | 5/2002 | Kunkel | |
| 2002/0083439 A1* | 6/2002 | Eldering | 725/32 |
| 2002/0087975 A1 | 7/2002 | Schlack | |
| 2002/0123928 A1 | 9/2002 | Eldering | |
| 2003/0056217 A1 | 3/2003 | Brooks | |
| 2003/0208767 A1 | 11/2003 | Williamson et al. | |
| 2003/0221191 A1* | 11/2003 | Khusheim | 725/35 |
| 2004/0010807 A1 | 1/2004 | Urdang et al. | |
| 2004/0015999 A1 | 1/2004 | Carlucci et al. | |
| 2004/0040035 A1 | 2/2004 | Carlucci et al. | |
| 2004/0059625 A1 | 3/2004 | Schrader | |
| 2004/0103429 A1 | 5/2004 | Carlucci et al. | |
| 2004/0148625 A1 | 7/2004 | Eldering | |
| 2004/0158858 A1* | 8/2004 | Paxton et al. | 725/42 |
| 2004/0237102 A1* | 11/2004 | Konig et al. | 725/36 |
| 2004/0244058 A1 | 12/2004 | Carlucci et al. | |
| 2005/0018691 A1 | 1/2005 | Riedl et al. | |
| 2005/0034171 A1 | 2/2005 | Benya | |
| 2005/0060742 A1 | 3/2005 | Riedl | |
| 2005/0120377 A1 | 6/2005 | Carlucci et al. | |
| 2005/0216932 A1* | 9/2005 | Danker | 725/32 |
| 2005/0278761 A1 | 12/2005 | Gonder et al. | |
| 2006/0047957 A1 | 3/2006 | Helms et al. | |

(Continued)

OTHER PUBLICATIONS

SCTE Announces New DPI Standardization Projects, News—Society of Cable Telecommunications Engineers, Aug. 9, 2004, pp. 1-2.

(Continued)

*Primary Examiner* — Pankaj Kumar
*Assistant Examiner* — Timothy Newlin
(74) *Attorney, Agent, or Firm* — Otterstedt, Ellenbogen & Kammer, LLP

(57) ABSTRACT

A digital video program is obtained. The program includes: (i) at least one broadcast segmentation message specifying at least one location for at least one broadcast advertisement, and (ii) at least one time-shifted segmentation message specifying at least one location for at least one time-shifted advertisement. The program is broadcast with at least one broadcast advertisement in accordance with the at least one broadcast segmentation message, and is made available to a subscriber at a time after the broadcasting, with at least one time-shifted advertisement in accordance with the at least one time-shifted segmentation message.

26 Claims, 8 Drawing Sheets

U.S. PATENT DOCUMENTS

| | | | |
|---|---|---|---|
| 2006/0122946 A1 | 6/2006 | Fahrny et al. | |
| 2006/0130107 A1 | 6/2006 | Gonder et al. | |
| 2006/0130113 A1 | 6/2006 | Carlucci et al. | |
| 2006/0218604 A1 | 9/2006 | Riedl et al. | |
| 2006/0271594 A1 | 11/2006 | Haberman | |
| 2007/0074243 A1* | 3/2007 | Verhaegh et al. | 725/32 |
| 2007/0101375 A1 | 5/2007 | Haberman | |
| 2007/0107011 A1 | 5/2007 | Li | |
| 2007/0136742 A1* | 6/2007 | Sparrell | 725/32 |
| 2007/0157228 A1* | 7/2007 | Bayer et al. | 725/34 |
| 2007/0157231 A1 | 7/2007 | Eldering | |
| 2007/0192192 A1 | 8/2007 | Haberman | |
| 2007/0192193 A1 | 8/2007 | Haberman | |
| 2007/0198349 A1 | 8/2007 | Haberman | |
| 2007/0217436 A1 | 9/2007 | Markley et al. | |
| 2007/0225996 A1 | 9/2007 | Haberman | |
| 2007/0225997 A1 | 9/2007 | Haberman | |
| 2007/0233571 A1 | 10/2007 | Eldering | |
| 2007/0288309 A1 | 12/2007 | Haberman | |
| 2008/0098212 A1 | 4/2008 | Helms et al. | |
| 2008/0112405 A1 | 5/2008 | Cholas et al. | |
| 2008/0177998 A1 | 7/2008 | Apsangi et al. | |
| 2008/0307453 A1 | 12/2008 | Haberman | |
| 2009/0133058 A1 | 5/2009 | Kouritzin | |
| 2009/0150941 A1 | 6/2009 | Riedl et al. | |
| 2009/0177542 A1 | 7/2009 | Haberman | |
| 2010/0031285 A1 | 2/2010 | Haberman | |
| 2010/0058378 A1 | 3/2010 | Feldman | |
| 2010/0100906 A1 | 4/2010 | Flickinger | |

OTHER PUBLICATIONS

Society of Cable Telecommunications Engineers, Engineering Committee, Digital Video Subcommittee, America National Standard, ANSI/SCTE 35 2007, Digital Program Insertion Cueing Message for Cable, pp. 1-41.

Anonymous, Targeted Television Advertising—Visible World, downloaded from http://www.visibleworld.com/ on Jul. 12, 2010.

Anonymous, Visible World Overview, downloaded from http://www.visibleworld.com/ on Jul. 12, 2010.

* cited by examiner

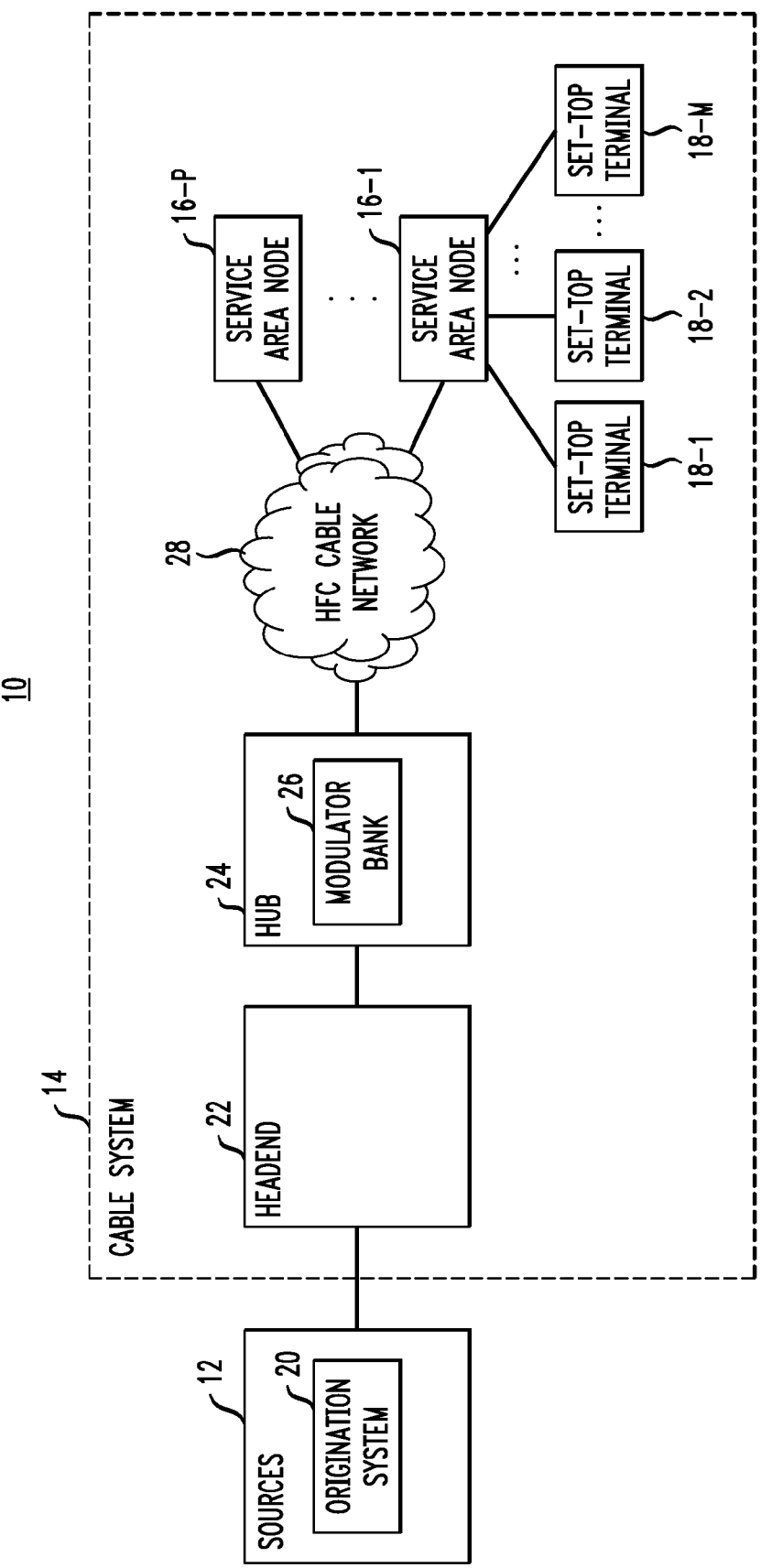

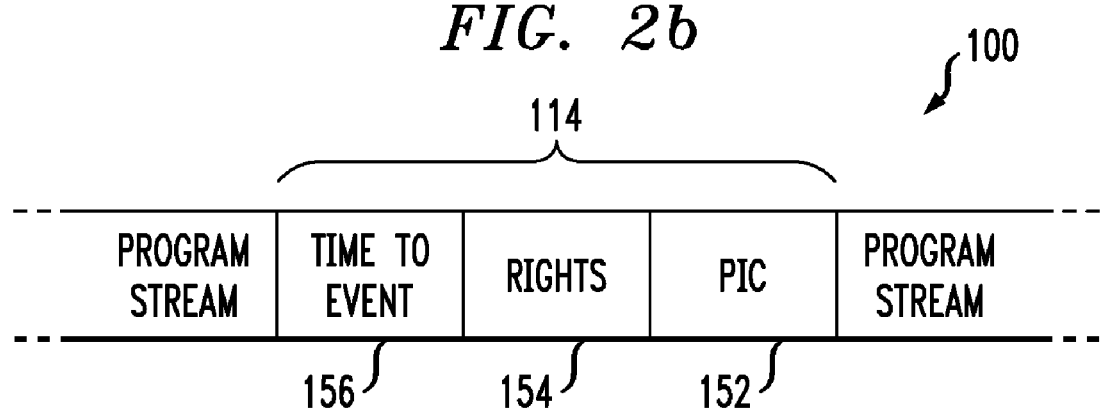
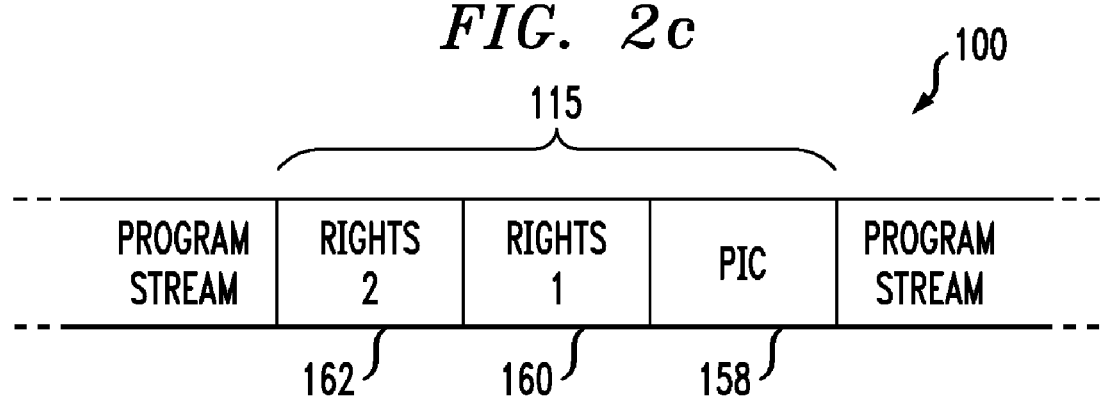

SYSTEM AND METHOD FOR CONTENT DELIVERY WITH MULTIPLE EMBEDDED MESSAGES

FIELD OF THE INVENTION

The present invention relates generally to communications systems and methods, and, more particularly, to video content networks.

BACKGROUND OF THE INVENTION

With the advent of digital communications technology, many TV program streams are transmitted in digital formats. For example, Digital Satellite System (DSS), Digital Broadcast Services (DBS), and Advanced Television Standards Committee (ATSC) program streams are digitally formatted pursuant to the well known Moving Pictures Experts Group 2 (MPEG-2) standard. The MPEG-2 standard specifies, among other things, the methodologies for video and audio data compression allowing for multiple programs, with different video and audio feeds, to be multiplexed in a transport stream traversing a single transmission channel. A digital TV receiver may be used to decode an MPEG-2 encoded transport stream, and extract the desired program therefrom.

The compressed video and audio data are typically carried by continuous elementary streams, respectively, which are broken into access units or packets, resulting in packetized elementary streams (PESs). These packets are identified by headers that contain time stamps for synchronizing, and are used to form MPEG-2 transport streams. For digital broadcasting, multiple programs and their associated PESs are multiplexed into a single transport stream. A transport stream has PES packets further subdivided into short fixed-size data packets, in which multiple programs encoded with different clocks can be carried. A transport stream not only includes a multiplex of audio and video PESs, but also other data such as MPEG-2 program specific information (sometimes referred to as metadata) describing the transport stream. The MPEG-2 metadata may include a program associated table (PAT) that lists every program in the transport stream. Each entry in the PAT points to an individual program map table (PMT) that lists the elementary streams making up each program. Some programs are open, but some programs may be subject to conditional access (encryption), and this information (i.e., whether open or subject to conditional access) is also carried in the MPEG-2 transport stream, typically as metadata.

The aforementioned fixed-size data packets in a transport stream each carry a packet identifier (PID) code. Packets in the same elementary streams all have the same PID, so that a decoder can select the elementary stream(s) it needs and reject the remainder. Packet-continuity counters may be implemented to ensure that every packet that is needed to decode a stream is received.

Video on demand (VOD) systems allow users to select and watch video content over a network. Some VOD systems "stream" content for real-time viewing. Others "download" the content to a set-top box before viewing starts. Use of digital video recorders (DVRs), also known as personal video recorders (PVRs), such as the TiVo® device (registered mark of TiVo Brands LLC, Alviso, Calif.) and the R Replay TV® device (registered mark of Digital Networks North America Inc., Pine Brook, N.J.), is ubiquitous. Such devices may provide some benefits to TV viewers. For example, a prior art DVR allows a user to record his or her favorite TV programs for later review, and to exercise a season-pass-like option wherein every episode of his or her favorite program is recorded for some period. Such devices may automatically record programs for the user based on his or her viewing habits and preferences. The presentation of the recorded programming content can be manipulated by exercising rewind, pause, skip and/or fast-forward functions (hereinafter referred to as "trick mode" or "trick play" functions) furnished by the DVR.

A "network PVR (NPVR)" (also referred to as an NDVR (Network Digital Video Recorder)) service allows the user to perform the analogous DVR functions through use of a network, rather than via a local DVR at the user premises. Unlike a DVR device, the NPVR service allows a user to "reserve" past and future programs for his or her review, even if such reserved programs were not identified by the user before their broadcast. Note that an NDVR can be distinguished from a DVR in that the latter, storage of programs and the like is local to the DVR, while in the former (NDVR) case, such storage is at the server or head end level.

US Patent Application Publication 2004/0015999 of Carlucci et al. entitled "Program Storage, Retrieval, and Management Based on Segmentation Messages, discloses segmentation messages indicative of locations of upcoming events, such as the start and end of programs and program portions, and/or rights related to the programs and program portions, which are used by cable systems and the like to store programs and program portions for later retrieval and transmission to customers on request. Storage, retrieval and management of programming are thereby facilitated. The complete disclosure of US Patent Application Publication 2004/0015999 of Carlucci et al. is expressly incorporated herein by reference in its entirety for all purposes.

US Patent Application Publication 2004/0244058 of Carlucci et al. entitled "Programming content processing and management system and method," discloses a technique to effectively receive streaming multimedia content in digital form, parse and segment the received transport stream and process the segmented content. Such treatment of received programming content provides for efficient storage of such programming content, and effectively provides for access to such content by administrators of a broadband system as well as users of such systems. The complete disclosure of US Patent Application Publication 2004/0244058 of Carlucci et al. is expressly incorporated herein by reference in its entirety for all purposes.

SUMMARY OF THE INVENTION

Principles of the present invention provide techniques for content delivery with multiple embedded messages. In one aspect, an exemplary method includes the step of obtaining a digital video program, the program including: (i) at least one broadcast segmentation message specifying at least one location for at least one broadcast advertisement, and (ii) at least one time-shifted segmentation message specifying at least one location for at least one time-shifted advertisement. The method also includes broadcasting the program with at least one broadcast advertisement in accordance with the at least one broadcast segmentation message, and making the program available to a subscriber at a time after the broadcasting, with at least one time-shifted advertisement in accordance with the at least one time-shifted segmentation message.

In another aspect, an exemplary method includes the steps of embedding, in a digital video program, at least one broadcast segmentation message specifying at least one location for at least one broadcast advertisement; and embedding, in the digital video program, at least one time-shifted segmentation message specifying at least one location for at least one time-shifted advertisement.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

An exemplary embodiment of an apparatus or system, according to still another aspect of the invention, can include a memory and at least one processor coupled to the memory. The processor can be operative to facilitate performance of one or more of the method steps described herein. Non-limiting examples of processors are those in an origination system, a receiver, a staging processor, an asset storage module, a schedule manager, an element management interface, a video server, a digital set-top terminal, and the like. In a further aspect, an apparatus or system can include means for performing the various method steps. The means can include one or more hardware modules, one or more software modules, or a mixture of one or more software modules and one or more hardware modules.

One or more method steps of the present invention can be implemented in the form of an article of manufacture including a machine readable medium that contains one or more programs which when executed implement such step(s).

Techniques of the present invention can provide substantial beneficial technical effects. For example, one or more embodiments have the advantage of allowing different advertisement (ad) insertion points and mechanisms depending on how the content is played or replayed (i.e., original linear broadcast, start-over functionality, NDVR, and the like)

These and other features and advantages of the present invention will become apparent from the following detailed description of illustrative embodiments thereof, which is to be read in connection with the accompanying drawings.

BRIEF DESCRIPTION OF THE DRAWINGS

FIG. 1a is a block diagram of certain components of a broadband communications system;

FIG. 1b is a block diagram of certain components of the head end of the broadband communications system of FIG. 1a;

FIG. 2b is an example of a content related segmentation message in a program stream;

FIG. 2c is an example of rights related segmentation in a program stream;

DETAILED DESCRIPTION OF PREFERRED EMBODIMENTS

Figure 1B:
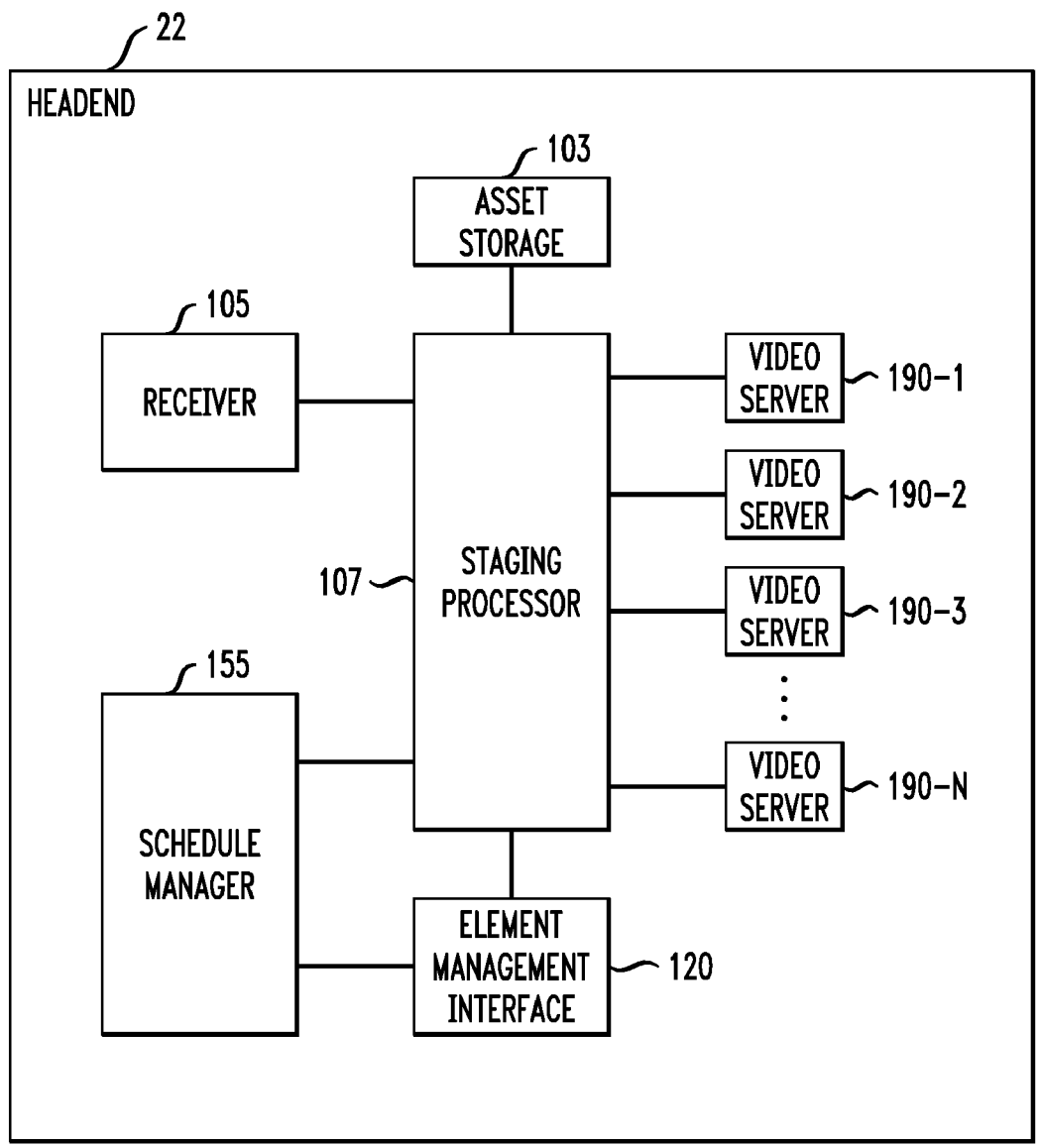

FIG. 1a is a block diagram of a broadband communications system 10 embodying principles of the invention. The system includes one or more program sources 12, and cable system 14 which includes a plurality of service area nodes 16-1 through 16-P in a neighborhood, where P represents an integer. Service area node 16-1, for example, is coupled to set-top terminals 18-1 through 18-M (where M is an integer) at customer's televisions (TVs). Information and entertainment services are delivered to set-top terminals 18-1 through 18-M.

Sources 12 create and deliver programming to cable system 14 through an origination system 20. Sources 12 may include analog and digital satellite sources that typically provide the traditional forms of television broadcast programs and information services. Sources 12 may also include terrestrial broadcasters, such as broadcast networks (CBS, NBC, ABC, etc., for example), which typically transmit content from one ground antenna to another ground antenna and/or via cable or fiber. Sources 12 may further include application servers, which typically provide executable code and data for application specific services such as database services, network management services, transactional electronic commerce services, system administration console services, application specific services (such as stock ticker, sports ticker, weather and interactive program guide data), resource management services, connection management services, subscriber care services, billing services, operation system services, and object management services; and media servers, which provide time-critical media assets such as Moving Pictures Experts Group 2 ("MPEG-2") standard encoded video and audio, MPEG-2 encoded still images, bit-mapped graphic images, pulse code modulation (PCM) digital audio, three dimensional graphic objects, application programs, application data files, etc. Although specific examples of programs and services which may be provided by the aforementioned sources are given herein, other programs and services may also be provided by these or other sources without departing from the spirit and scope of the invention.

Cable system 14 includes head end 22, which processes program materials, such as TV program streams, for example, from sources 12 in digital and analog forms. Digital TV program streams may be formatted according to the Motorola Digicipher System, Scientific Atlanta Powerview Systems, Digital Satellite System (DSS), Digital Broadcast Services (DBS), or Advanced Television Standards Committee (ATSC) standards, for example. Analog TV program streams may be formatted according to the National Television Standards Committee (NTSC) or Phase Alternating Line (PAL) broadcast standard. Head end 22 extracts program content in the analog and digital TV program streams and formats the content, as required, to form one or more MPEG-2 encoded transport streams for transmission to users, e.g., at set-top terminals 18-1 through 18-M. Other video codecs (coder/decoders) may be applied. Reformatting may even be applied to those received streams already in an MPEG-2 format. This stems from the fact that the MPEG-2 formatted digital content in the received streams are typically encoded at a variable bit rate (VBR). To avoid data burstiness and to allow for simple re-multiplexing, head end 22 may re-encode such digital content at a constant bit rate (CBR) to form transport streams in a conventional manner.

Typically, the transmission of data to, for example, hub 24 requires processing at each hub to re-quantize and convert the content to a CBR. By converting the content at head end 22, however, the need for a CBR to VBR conversion at hub 24 is obviated. Because a typical cable system tends to utilize a larger number of hubs than head ends, the processing of the content at head end 22, rather than hub 24, reduces the number of CBR to VBR conversions and therefore reduces the processing resources used by system 10.

In addition, by converting received content to CBR at the head end 22, the storing of such content onto one or more of video servers 190-1 through 190-N, as seen in FIG. 1b, becomes more predictable and therefore manageable. This is accomplished because the rate in which content is transmitted to video servers 190-1 through 190-N is set at a constant rate (e.g. 3.75 MB/second). Thus, because the processing rate is constant, the time for storing a program at a predetermined CBR onto one or more of video servers 190-1 through 190-N may be calculated in advance of such storage.

The generated transport streams are typically transmitted from head end 22 to hub 24 via Internet Protocol ("IP") transport over optical fiber. The transport streams may also be transmitted as intermediate frequency signals that have been amplitude modulated ("AM") or as a digital video broadcast (DVB) asynchronous serial interface (ASI) that has also been AM modulated. Hub 24 includes modulator bank 26, among other components. Modulator bank 26 includes multiple modulators, each of which is used to modulate transport streams onto different carriers. Hub 24 is connected to hybrid fiber/coaxial (HFC) cable network 28, which is connected to service area nodes 16-1 through 16-P. The short form "coax" is also used for "coaxial" herein. The transport streams may be recorded in head end 22 so that the users at the set-top terminals may manipulate (e.g., pause, fast-forward or rewind) the programming content in the recorded transport streams in a manner described in US Patent Application Publication 2003/0208767 of Williamson et al., entitled "Network based digital information and entertainment storage and delivery system," the complete disclosure of which is expressly incorporated by reference herein in its entirety for all purposes.

In addition, in accordance with an embodiment of the invention, the transport streams are processed and stored in head end 22 based, at least in part, on segmentation messages, as described further below and in a manner further described in US Patent Application Publication 2004/0015999 of Carlucci et al.

FIG. 1b is a block diagram of certain components of head end 22 of the broadband communications system 10 of FIG. 1a, in accordance with an embodiment of the invention. Head end 22 includes staging processor 107 which is in communication with, among other things, receiver 105, element management interface (EMI) 120, schedule manager 155, video servers 190-1 to 190-N (for example, video-on-demand (VOD) servers), where N is an integer, and asset storage 103, as illustrated in FIG. 1b. It should be noted that the video servers 190-1 to 190-N may be the same manufacturer and model, thereby having the same specification, or may be of different manufacturers and specifications. Thus one server may have different characteristics (such as reliability, processing speed or output capability) than one or more of the other video servers. Receiver 105 receives programming content from origination system 20 and is the source of the transport stream (which in this case is in MPEG-2 format) processed by the staging processor 107. Output from receiver 105 may be compliant with one or more standards, including Digital Head end Interface (DHEI), Digital Video Broadcasting-Asynchronous Serial Interface (DVB-ASI), {fraction (10/100)} baseT, or the like. Staging processor 107 has a plurality of output ports (109-1 through 109-N), as shown in FIG. 1c, for transmission of received and segmented programming content to video servers 190-1 through 190-N (shown in FIG. 1b).

EMI 120 is responsible for performing static configuration and monitoring of staging processor 107. As described below, EMI 120, among other things, labels content delivered by a provider (e.g., "HBO", "NBC," etc.) to staging processor 107 from receiver 105. EMI 120 also configures mapping of input services to specific output internet protocol (IP) addresses and user datagram protocol/Internet protocol (UDP/IP) port numbers for use in switched video digital broadcasting. An example of such broadcasting is described in US Patent Application Publication 2003/0056217 of Brooks, entitled "Technique for effectively providing program material in a cable television system," the complete disclosure of which is expressly incorporated herein by reference in its entirety for all purposes. In addition, as described below, EMI 120 monitors staging processor 107 and schedule manager 155 to ensure that these components are active when such state is desired and that such components are operating properly.

Figure 1C:
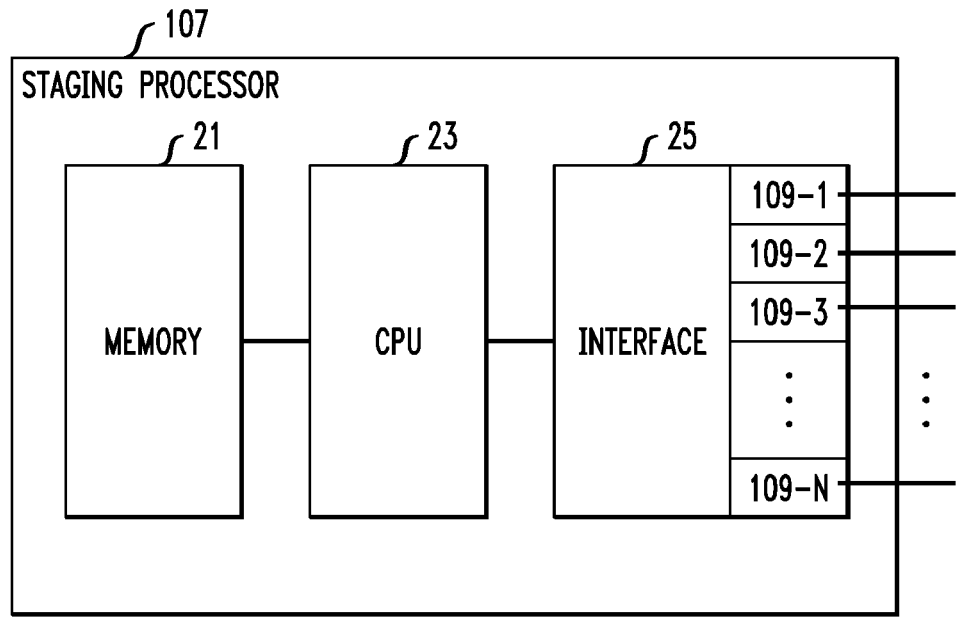
FIG. 1c is a block diagram of the staging processor of the head end of FIG. 1b.

As illustrated by FIG. 1c, staging processor 107 includes memory 21, central processing unit (CPU) 23 and interface 25. Staging processor 107 and schedule manager 155 share a common time reference which allows their communication to follow a contemporaneous timeline. This may be accomplished by, for example, the provision of a system clock (not shown) residing in head end 22 with which staging processor 107 and schedule manager 155 are synchronized.

Figure 1D:
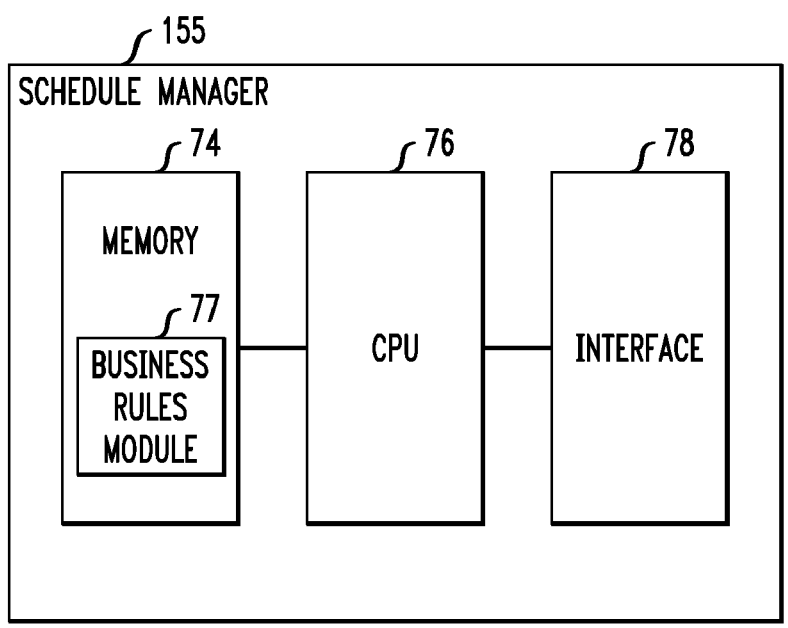
FIG. 1d is a block diagram of the schedule manager of the head end of FIG. 1b.

Schedule manager 155 (which includes memory 74, CPU 76 and interface 78, as illustrated in FIG. 1d) is configured for determining if a particular program should be extracted from a program stream received by staging processor 107 and for providing instructions to staging processor 107 in accordance with one or more business rules relating to further processing of parsed programming content. These business rules can be stored in business rules module 77 of schedule manager memory 74. These types of business rules are described in detail in US Patent Application Publication 2004/0244058. Aspects of the invention may also make use of business rules encoded within ANSI/SCTE 35 messages, as discussed below.

Thus, if a program is to be captured as a content object, schedule manager 155 creates a content object which may then reference a title that may be ultimately stored on a video server 190 (such as a VOD server), or some other short term or long term storage device. Staging processor 107 segments program streams based on the segmentation messages in the program stream and externally provided program schedule information, under the control of schedule manager 155.

Program schedule information may be provided to schedule manager 155 by an electronic program guide ("EPG") data server (not shown) in the form of program guide data tables that include a program identification code ("PIC") and the scheduled program start and end times for each program. The transport stream carrying program guide data is typically provided by a third party that aggregates program scheduling information from a plurality of sources. The program guide in the data stream may be stored in schedule manager memory 74 or other such memory in head end 22.

Figure 2A:
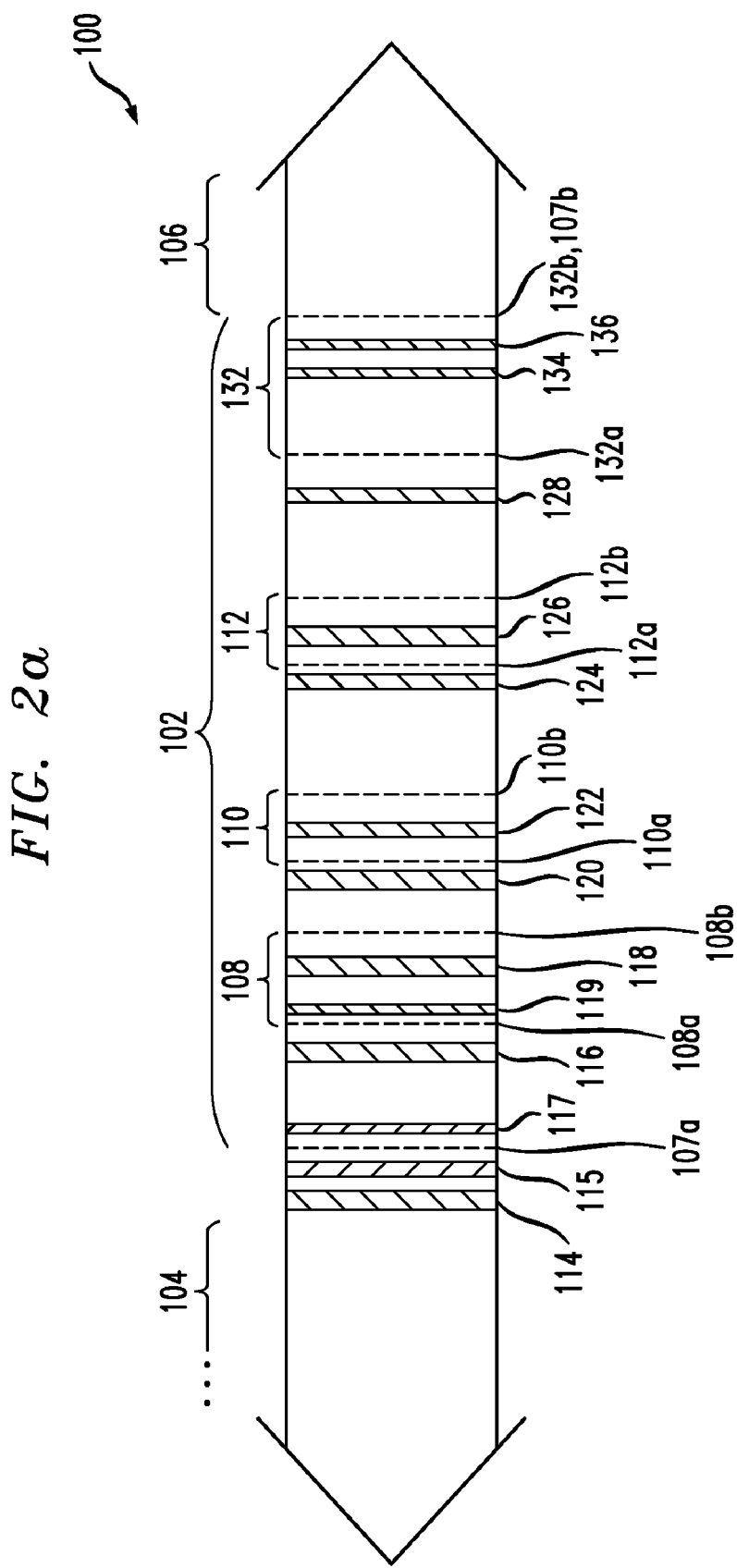
FIG. 2a is a schematic representation of a program stream segmented with segmentation messages.

FIG. 2a is a schematic representation of a program stream 100, carrying video information, segmented with segmentation messages in accordance with an embodiment of the invention. The program start and program end segmentation messages in the transport stream 102 provide more precise program start and end times than those provided in the stored program guide data. The transport stream carrying program guide data typically does not provide any information about program portions, such as chapters or advertisements.

Program stream 100 includes a plurality of TV programs, including TV program 102. Portions of TV program 104 preceding TV program 102 and TV program 106 following TV program 102 are shown, as well. TV program 102 starts at point 107a and ends at point 107b. TV program 102 may include chapter 108, such as a monolog, skit, musical performance, guest appearance, sports highlight, interview, weather report, and innings of a baseball game, for example. Chapter 108 starts at point 108a and ends at point 108b. A network commercial 110 and a local commercial 112 are also included within the expanse of program 102, with respective start and end points 10a, 10b, 112a, 112b. Unscheduled content 132 is indicated, with start and end times 132a, 132b, respectively, to represent an overrun of a program, such as overtime in a sports event, for example. Unscheduled content 132 could also be news bulletin. Unscheduled content 132 may or may not be present in a particular program or program stream. A TV program may contain more or fewer chapters 108, network commercials 110 and local commercials 112. Content-related segmentation messages 114, 116, 118, 120, 122, 124, 126, 128, 134 and 136 are also included in stream 100.

Segmentation message 114, which may be referred to as a program start message, indicates that TV program 102 will start in A seconds from the time of the appearance of that message. The time period may be defined in segmentation message 114. Segmentation message 114 may also include a PIC that uniquely identifies the program. Other PICs may be used to identify other program segments, such as chapters or advertising. Other information, such as rights-related information, may be provided in segmentation message 114, as well. For example, the rights information may indicate whether there is a right to copy and store program 102 in cable system 14 for later retrieval. FIG. 2b is an example of a segmentation message, such as segmentation message 114, in program stream 100. Segmentation message 114 includes PIC field 152, rights-related information field 154 and time until event field 156, which here indicates the time until the start of program 102.

Instead of including rights information in segmentation message 114, it may be provided in a separate message 115, as shown in FIG. 2c. Rights message 115 may have a similar configuration as segmentation message 114 of FIG. 2b, except that time to event field 156 is not needed. PIC field 158, and two rights fields 160, 162 are shown. More or fewer rights fields may be provided, depending on the number of rights that need to be defined.

Content and rights-related segmentation messages may be formatted in accordance with, for example, the ANSI/SCTE 35 standard for Digital Program Insertion Cueing Message for Cable, promulgated by the Society of Cable Telecommunications Engineers and the American National Standards Institute, and formerly known as the DVS-253 (ANSI/SCTE 35 2001) cueing standard. A segmentation message may be in the form of a packet delineated by a sync byte, which is a byte that is unlikely to be replicated in the program stream. The fields discussed above may follow the sync byte, separated by commas. Segmentation messages may be provided over a single channel for all programs in the multiplex. The ANSI/SCTE 35 standard is hereby incorporated by reference in its entirety for all purposes.

Returning to FIG. 2a, another rights-related segmentation message 117 is provided after start 107a of program 102. It may be useful to provide a rights message within the expanse of the program or program portion to which the right relates, in addition to or instead of providing rights-related segmentation message 115 prior to the start of program 102. If both rights-related segmentation message 115 and 117 are provided, different types of rights information may be provided in each. For example, the right to copy program 102 may be included in segmentation message 115, so that head end 22 will know prior to the arrival of program 102 whether or not program 102 may be processed for storage. Other types of rights, such as the right to store the program for a limited period of time, which is useful information to have access to after program 102 is stored, may be provided within the expanse of program 102, in rights segmentation message 117. Other rights related to the use of the stored program may also be more advantageously stored within the expanse of program 102 in message 117. Messages may be transmitted for increased robustness.

Segmentation message 136, which may be referred to as a program end message, indicates that TV program 102 will end in B seconds from the appearance of message 136. The program identification code, and any other desired information, may be included in the message, as well.

Segmentation message 116, which may be referred to as a chapter start message, indicates that a chapter will start in C seconds from the appearance of message 116. A PIC field and a field for an identification code for chapter 108 may be included in the message. A rights information field may also be incorporated in segmentation message 118 or in a separate rights segmentation message 119 within the expanse of chapter 108, particularly if chapter 108 has different rights associated with it than the rights associated with program 102. Segmentation message 118, which may be referred to as a chapter end message, indicates that chapter 108 will end in D seconds from the appearance of message 118.

Segmentation message 120, which may be referred to as a network advertising start message, indicates that network advertising will start in E seconds from the appearance of message 120. A PIC field and a field for an identification code for that segment of advertising may be included in segmentation message 120, as well. Rights information, if any, which may relate to that advertising segment, may be included in segmentation message 120 or in a separate segmentation message (not shown) associated with advertising segment 110. For example, contractual obligations with respect to program 102 may require that the advertising segment 110 be included whenever program 102 is broadcast. Alternatively, the right to delete or replace advertising may be granted. Providing such information in segmentation message 120 or in a separate segmentation message associated with the advertising segment 110, facilitates correct processing of program 102 for storage and assists in ensuring that rights obligations are met. Segmentation message 122, which may be referred to as a network advertising end message, indicates that the network advertising will end in F seconds from the appearance of message 122.

Segmentation message 124, which may be referred to as a local advertising start message, indicates that local advertising will occur in G seconds from the appearance of message 124. A PIC field and a field for an identification code for that segment of local advertising, may be included in segmentation message 120, as well. As above, rights information relating to that segment of local advertising may also be provided in segmentation message 124 or in another segmentation message associated with local advertising segment 112. Segmentation message 126, which may be referred to as a local advertising end message, indicates that that break will end in H seconds from the appearance of message 126. Advertising is typically included in program stream 100 as provided by a source 12 in the expanse 112, indicated by the local advertising start and local advertising end messages 124, 126. Cable system 14 may insert local advertising into the program stream, replacing the advertising originally provided by a source 12. Cable system 14 may use segmentation messages 124, 126 to determine when to start insertion of the local advertising and when to return to the program stream 100. The advertising may be inserted at the head end 22 or at set-top terminals 18-1 through 18-M.

If program 102 extends beyond its expected end time (such as if program 102 is a sporting event going into overtime, for example), an unscheduled content start segmentation message 128 may be provided, to indicate the start of unscheduled content 132 in I seconds. A PIC field and a field for an identification code for the unscheduled content may also be included. Rights information may be included, as well.

If the unscheduled content is overtime in a sporting event, for example, the unscheduled content ends at the end 107b of program 102. Program end segmentation message 136 may indicate the end of both program 102 and unscheduled content 132 or an unscheduled content end segmentation message 134 may be provided.

If the unscheduled content is a news bulletin, for example, it may end prior to the end of program 102. An unscheduled content end message 134 is then preferably provided to indicate the end of that content.

After the unscheduled content is completed, program 102 may continue to be broadcast at the point where the program was interrupted. In that case, the entire program 102 is broadcast. However, program 102 may then run over the scheduled end time. The unscheduled content end message 134 will indicate when the unscheduled content ends. Alternatively, if the progress of program 102 continues while the unscheduled content is being broadcast, program 102 will end on time, but part of program 102 will not be shown to the viewer. Cable system 14 may want to warn the viewer that a portion of the show is being preempted or will run over the scheduled end time. In addition, whether a program has been pre-empted may affect treatment as a stored asset for later retrieval. For example, users may be notified that the program was not broadcast in its entirety and the requested program will not be complete. If the pre-emption is due to a news bulletin, the bulletin may be stored as a separate asset, as well. It may therefore be useful to include information indicating whether a portion of program 102 is preempted so that program 102 ends on time or that program 102 is not preempted and will run over the scheduled end time, in unscheduled content segmentation message 128 or in another segmentation message.

The A through I time periods referred to above are real numbers. Time periods A through I each may be 6 seconds, for example. Other time periods may be used and different time periods may be used for different segmentation messages. Alternatively, it may be previously defined that all segmentation messages, or segmentation messages of certain types, indicate a predetermined time period until the occurrence of the event. Further, in at least some cases, a time period of zero may be used (i.e., no lead time between segmentation message and ad).

Both ends of a program or a program portion (such as chapter 108), are preferably indicated by separate segmentation messages. Alternatively, both the time until a start of a program or program portion and the time until the end of that program or program portion may be indicated in the same segmentation message. For example, in segmentation message 114 in FIG. 2b, where Time to Event field 156 indicates the time until the start of program 102, an additional field may be provided to indicate the time until the end of program 102 and/or the duration of the program. Such a segmentation message should be positioned prior to the start of the respective program or program portion. Both a program start segmentation message including a time to end or duration of a program and program end segmentation message 136 may be provided for redundancy, as well.

As shown in FIG. 2a, expanses may exist within other expanses. For example, together, a program start message 114 and a program end message 136 define an expanse of the entire program 102. Program start and end messages for chapter 108, network advertising 110 and local advertising 112 define expanses of the respective program portions within the expanse of program 102. If any portion of a program has a start message without a corresponding end message, program end message 136 terminates all segments without their own end message. If a chapter or advertisement portion is the beginning of a program, a corresponding start message preferably accompanies the program start message, and defines the same boundary time. As mentioned above, a program end message 136 can terminate unscheduled content segment 132.

In accordance with another embodiment, segmentation messages may be sent multiple times or periodically, for redundancy. Since errors in defining the start 107a and end 107b of program 102 could result in storage of an incomplete program or storage of one program including a portion of another program, the program start and program end messages 114, 128, and other such significant segmentation messages, are preferably sent two or more times prior to the event boundary. For example, the program start message 114 and the program end message 136 may be sent twice within a 5 to 8 second window prior to the respective boundary. Advertising segmentation messages, particularly those defining an expanse of local advertising, where cable system 14 may insert its own advertising, are also preferably sent multiple times, because missing an advertising insertion point could adversely impact advertising revenue. Messages may be sent minutes before the boundary as well. That is to say, the lead time between a segmentation message and an ad is not limited to times on the order of seconds, but may also encompass times on the orders of minutes. As with times on the order of seconds, times on the order of minutes could be fixed or variable.

Other important segmentation messages that may be repeated are the unscheduled content start message 128 and the unscheduled content end message 134. Since the unscheduled content may extend beyond the scheduled end time of program 102, it is important for the cable company to know this as soon as possible. The exact end time of the unscheduled content may not be known but the end message can indicate an expected time to end of content in the message. The value of the expected time to end of content may become more accurate as the unscheduled content progresses towards its conclusion, and the segmentation messages may reflect this developing accuracy.

For further redundancy, the messages may be sent periodically throughout a program or program portion. For example, a segmentation message to indicate an event may be sent every minute starting from the start of a prior event. As an event is approached, the time period between messages may become shorter. For example, messages may be sent every minute until the boundary is 1 minute away. Then the messages may be sent every 10 seconds or more frequently. Segmentation messages may also be provided within one or more prior portions to indicate an event in a subsequent portion. For example, in program stream 100, national advertising start messages 120 may appear one or more times within chapter 108 or even before the start of chapter 108 in the program stream.

If two segmentation messages received at different times indicate different event times, the time of the segmentation message arriving last is considered to be more accurate. It may, for example, reflect an unanticipated change in the end time of a program, such as overtime or postponement of a commercial in a sports event.

Other segmentation messages that may be provided include a table of all of the segmentation points in a program. A segmentation point is a place in a transport stream in which a content provider can insert a segmentation message. Tables of particular types of segmentation messages or all of the segmentation messages may also be embedded in program stream 100. For example, a table of each type of advertising (national and local, for example) in a program may be provided. Additional information may be provided in the segmentation message to identify a commercial sponsor of respective advertising to assist cable system 14 in inserting appropriate advertising. For example, if the segmentation message includes an indication that a national ad that must be broadcast is for a soda company (Acme-Cola, for example), then a cable system 14 can more readily avoid placement of an advertisement for a second soda company (Zenith-Cola, for example), in a local ad spot in proximity to the ad for the first soda company, which may be a contractual obligation of cable system 14. Receipt of such information in a table at the beginning of a program or prior to that, allows cable system 14 time to plan for ad placement in the program. Providing all segmentation messages in a table in program stream 100 at the beginning of a program or prior to that gives cable system 100 more time to plan for other events, as well.

Another segmentation message that may be provided is a message to indicate that a scheduled program is being replaced by source 12, or may be replaced by cable system 14, by substitute programming. For example, if a sporting event is cancelled due to rain, source 12 may provide substitute programming and the cable company may have the option of providing its own substitute programming. A segmentation message may be provided as part of program start message 114 or prior to it, to indicate that substitute programming follows, and to identify the programming.

So-called start-over functionality may be available in one or more embodiments of the invention. Such functionality allows digital cable subscribers to restart specially enabled shows already in progress by using their cable remote controls. Like a full-fledged DVR or NDVR, the service also lets viewers pause and rewind shows in progress. However, start-over functionality typically does not allow for skipping through commercials or storing copies of recorded programs. Such start-over functionality per se is known to the skilled artisan from, for example, the aforementioned US Patent Application Publication US2003/0208767 A1 of Williamson et al., as well as US Patent Application Publication US2005/0034171 of Benya, entitled "Technique for delivering programming content based on a modified network personal video recorder service," the complete disclosure of which is expressly incorporated by reference herein, in its entirety, for all purposes.

Figure 3:
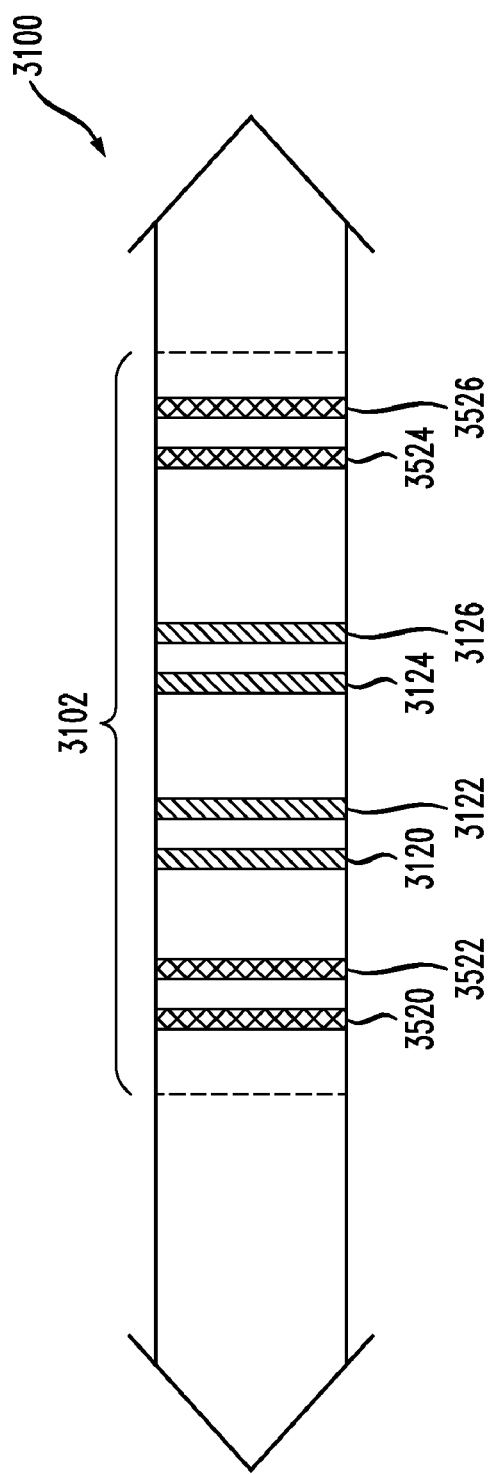
FIG. 3 is a schematic representation of a program stream segmented with segmentation messages, according to an aspect of the invention.

For content which is only destined for a linear broadcast (i.e., no start-over or NDVR functionality), the segmentation messages described with regard to FIG. 2*a* work well. However, in the case of start-over or NDVR functionality, from the network perspective, with current techniques, two different versions of a program stream 100 are required: (i) linear and (ii) recorded. Ads are inserted in the broadcast via the aforementioned ANSI/SCTE 35 messages delineating insert points. The requirement in this approach is for two different versions of the program stream; one linear, and one start-over. In an approach in accordance with one or more embodiments of the invention, only a single version is required. In this scenario, as seen in FIG. 3, there are "linear here insert" and "start-over here insert" messages. Targeted ads can be inserted for start-over.

In particular, elements in FIG. 3 similar to those in FIG. 2*a* have received the same reference character incremented by three thousand. Elements other than the ANSI/SCTE 35 messages delineating network and local ads have been omitted for clarity. In the exemplary embodiment of FIG. 3, single-hatched network ad start and end messages 3120, 3122 and single-hatched local ad start and end messages 3124, 3126 are provided as before, but may include an additional field to indicate that they are to be given effect during initial broadcast of program 3102. Also provided are double-hatched network ad start and end messages 3520, 3522 and double-hatched local ad start and end messages 3524, 3526, which may include an additional field to indicate that they are to be given effect during subsequent start-over or NDVR viewing of program 3102. Of course, in alternative embodiments, a single message such as 3520 or 3524 may delimit both the start and end of a local or network ad; for example, by including two time fields, a time to start of event field and a time to end of event field, in lieu of single time to event field 406. The start-over messages 3520, 3522, 3524, 3526 may be at different locations in program 3102 than the broadcast ads 3120, 3122, 3124, 3126, or may be at the same locations. In the latter case, to handle the situation where an ad is desired at the same time in program 3102 in both broadcast and start-over modes, one approach is to place the start-over message a short time before or after the broadcast message, and then adjust the field 406 that specifies how long before the start of the ad.

Thus, to reiterate, currently ANSI/SCTE 35 messages are used to splice content in which advertisements can be inserted into a content stream; the insertion points are triggered by the ANSI/SCTE 35 messages. In the linear feed, only about one minute per hour is available to insert local ads over a cable network. Most ads are national feed and come pre-inserted in the stream. New services such as start-over and NDVR functionality offer versions of content that can be replayed in a time shifted manner. One or more embodiments of the invention allow one (or one set) of ANSI/SCTE 35 messages slated for the linear feed, such as 3120, 3122, 4124, 3126, and one (or one set) of ANSI/SCTE 35 messages, such as 3520, 3522, 3524, 3526 slated for start-over or NDVR functionality.

For example, the linear triggers could indicate two insertion points per hour, while, when the content is placed in the start-over servers (for example, VOD servers 190), the other message (or set of messages such as 3520, 3522, 3524, 3526) in the stream are employed, which indicate insertion points for start-over. The second message (or set of messages such as 3520, 3522, 3524, 3526) for the start-over or NDVR case may define different points than in the linear case, as well as particular ads (in terms of time, duration, etc.), and so on. This approach may be advantageous, inasmuch as, since the program will be shown at different times, different ads may be more or less relevant.

One or more embodiments of the invention may be useful in regionalized advertising, local ad insertion (multiple sales for single content source), and the like; furthermore, one or more embodiments of the invention allow for different ad insertion points and mechanisms, depending on how the content is replayed (i.e., linear, start-over, NDVR, etc.). This is to be contrasted with current techniques, wherein only one ANSI/SCTE 35 message (or set of messages) is employed for all types of content stream replay mechanisms.

Thus, one or more instances of the invention address new uses of ANSI/SCTE 35 messages, which programmers (e.g., sources 12) can embed into program streams to enable cable multi-service operators (MSOs) (operating, for example, cable system 14) to use their programming in a novel fashion. Currently, when a programmer sends the MSO a program, if it is an ad-inserted program, ad insertion is triggered via the ANSI/SCTE 35 trigger points, which the programmers can include for ad insertion and the like. This works well for linear programming, but in many instances, the program is also being captured on VOD servers 190 and played back later in the aforementioned start-over mechanism. In one or more embodiments of the invention, when the program is playing live, there may be, for example, one or two spots where ads can be inserted, triggered by ANSI/SCTE 35 messages, and when the program is being played later on, on the VOD server, other, different ad spots can be introduced into it. For example, VOD typically uses bumper ads which play before the video starts—ad avails in the start-over case may be identified in the video. Furthermore, there may be other ads in the video that are no longer relevant, because of time variation. Indeed, in some cases, ads may become irrelevant very quickly, by the next day or even sooner. In one or more embodiments of the invention, the programmer provides two different types of messages, one for live events, which honor live ad spots (e.g., 3120, 3122, 3124, 3126); and other messages (e.g., 3520, 3522, 3524, 3526) that are used once the program is recorded to the server 190, which trigger new points to insert ads (which can be at the same or different places as those for the live events), to replace national or other ads that may not be relevant at that time.

ANSI/SCTE 35 messages are, in essence, the digital equivalent of cue tones. Currently, only one type is employed—in one or more embodiments of the invention, two different types are used, one (e.g., 3120, 3122, 3124, 3126) to cue ads for the live version, and one (e.g., 3520, 3522, 3524, 3526) to cue ads for a start-over and/or VOD sessions. Of course, more than two different types could be used; for example, one for live, one for start-over, one for another NDVR environment, and so on. In one or more embodiments, the programmer (e.g., source 12) who provides content to the cable MSO (e.g., operator of system 14) inserts the two different types of messages.

ANSI/SCTE 35 messages are extendable—messages can be employed to indicate the start of the program, or for live content at one or two local ad insertion spots in the program, as discussed with regard to FIG. 2*a*. In one or more embodiments of the invention, messages can be inserted at other programming spots to indicate that the particular spot is used in a start-over or NDVR mode. In some cases, an indication is provided in the ANSI/SCTE 35 messages that certain ads cannot be replaced for some time period. For example, business rules can be built into the ANSI/SCTE 35 messages to protect the advertising. Consider a case where the program is a football game and Acme-Cola is a sponsor. Business rules might say that during the start-over or NDVR modes, the original Acme-Cola ad can be replaced with a more relevant Acme-Cola ad, but not with an ad for rival Zenith-Cola. By way of a non-limiting illustration, the football game in question might be a playoff game scheduled for January, and the original ad may show people drinking Acme-Cola after skiing. When a football fan re-plays the playoff game in June, the ANSI/SCTE 35 messages allow an ad depicting people drinking Acme-Cola on the beach while having a picnic, but do not allow a Zenith-Cola ad. The skilled artisan will be familiar with ANSI/SCTE 35 messages, and, given the teachings herein, will be able to employ existing data fields in such messages to encode additional information and implement the functionality described herein. Thus, one or more embodiments of the invention use ANSI/SCTE 35 messages differently from live to non-real-time content, to control the ads.

Figure 4:
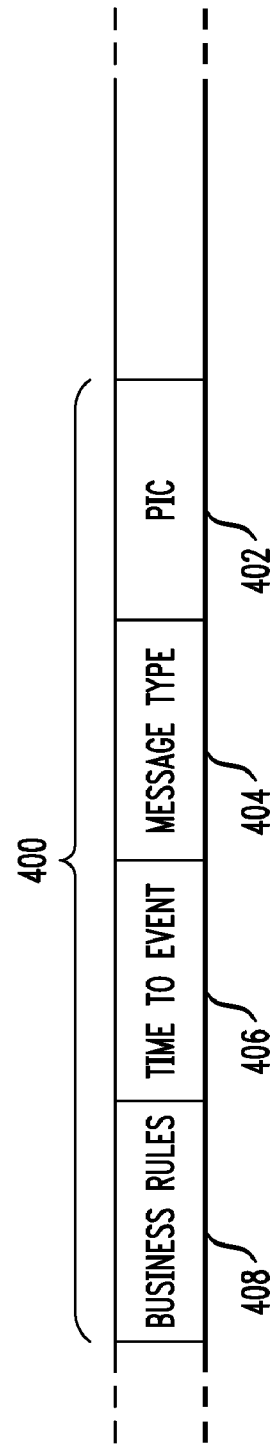
FIG. 4 is an example of an advertisement-related segmentation message in a program stream, according to another aspect of the invention.

FIG. 4 shows a generalized ANSI/SCTE 35 message 400, which is representative of any of the messages shown in FIG. 3. The PIC field 402 and time to event field 406 can be included as described elsewhere. A message type field 404 may specify whether the message is for (i) a broadcast ad or (ii) a start-over and NDVR ad (in some cases, there may be more than two choices; for example, (i) a broadcast ad, (ii) a start-over ad, and (iii)an NDVR ad). A business rules field 408 may specify pertinent business rules, such as substitution rules as described elsewhere herein. In some embodiments, this field may contain a predefined code that corresponds to predefined business rules; e.g., substitution acceptable if substitute ad from same sponsor, or substitution acceptable if not substituted with a rival of sponsor, and so on. In one or more embodiments, the rules are employed for the start-over and NDVR version(s), but not for the broadcast version, yet they make use of information about the broadcast version, such as who the sponsor as. Appropriate information may be encoded in the segmentation message for the start-over and NDVR versions(s), for example, "sponsor of broadcast was Acme-Cola, no ads for Zenith-Cola allowed in start-over and NDVR version(s)."

Exemplary embodiments have been described in the context of a cable company or cable MSO operating an HFC network and receiving programming from sources 12. However, in general terms, aspects of the invention may be pertinent whenever the operator of a content network receives content from a programmer. One or more of the following types of content network are exemplary of those that can be used with one or more embodiments of the invention:

a cable television network (or other content network, for example, a telecommunications company video delivery network such as fiber to the home (FTTH), fiber to the curb (FTTC), or digital subscriber line (DSL)), a wireless network such as a cellular network, a Transmission Control Protocol/Internet Protocol (TCP/IP) network, a DOCSIS® (Data Over Cable Service Interface Specification) network (registered mark of Cable Television Laboratories, Inc., 400 Centennial Parkway Louisville Colo. 80027, USA).

Other types of networks and other technologies useful in connection with one or more embodiments of the invention include those disclosed in US Patent Application Publication 2005/0120377 of Carlucci et al. entitled "Technique for effectively providing various entertainment services through a communications network" and US Patent Application Publication 2004/0010807 of Urdang et al. entitled "Use of multiple embedded messages in program signal streams." The complete disclosures of both US Patent Application Publication 2005/0120377 of Carlucci et al. and US Patent Application Publication 2004/0010807 of Urdang et al. are expressly incorporated herein by reference in their entireties for all purposes.

Comments will now be provided regarding transmission of programs with ads in (i) broadcast and (ii) start-over and NDVR modes, in accordance with aspects of the invention. Receiver 105 may receive a program for broadcast from a source 12. In some instances, the program already has the ads intended for broadcast (or at least the network ads intended for broadcast) embedded therein, while in other instances, the ads intended for broadcast (or at least the local ads intended for broadcast) are obtained separately, stored in asset storage 103, and retrieved by staging processor 107 for broadcast, in locations specified by messages 3120, 3122 (network) and 3124, 3126 (local). Processor 107 may, as a default, use the broadcast messages 3120, 3122, 3124, 3126, which may be identified as broadcast messages based on a flag that is set in a suitable field. Note that processor 107 may have acquisition and staging capability, and that asset storage block 103 may have, for example, asset management logic (implemented by a suitable processor) as well as storage, for example, on the order of terabytes.

Consider now the start-over and NDVR case. In such a case, head end 22 receives a request for material from one of the terminals 18; for example, via a reverse data channel (RDC) of the kind well-known to the skilled artisan and described, for example, in US Patent Publication 2004/0244058. Staging processor 107 (or another element with processing capability; for example, one of the servers 190) may "know" that the start-over or NDVR version of the messages, e.g., 3520, 3522, 3524, 3526 should now be used for ad insertion, since the material is being viewed in response to a start-over or NDVR request over the RDC. Staging processor 107 (or another element with processing capability; for example, one of the servers 190) ignores the broadcast messages and inserts ad content in accordance with the start-over or NDVR version of the messages, e.g., 3520, 3522, 3524, 3526. In some instances, ads (or at least local ads) may be inserted by terminals 18, responsive to the (i) broadcast and/or (ii) start-over and NDVR versions of the messages. Techniques described in, for example, US Patent Application Publication 2004/0015999 may be readily adapted by the skilled artisan, given the teachings herein. For example, terminal 18 may "know" that it has requested NDVR or start-over functionality, and may therefore ignore messages 3120, 3122, 3124, 3126 and give effect to messages 3520, 3522, 3524, 3526.

Figure 5:
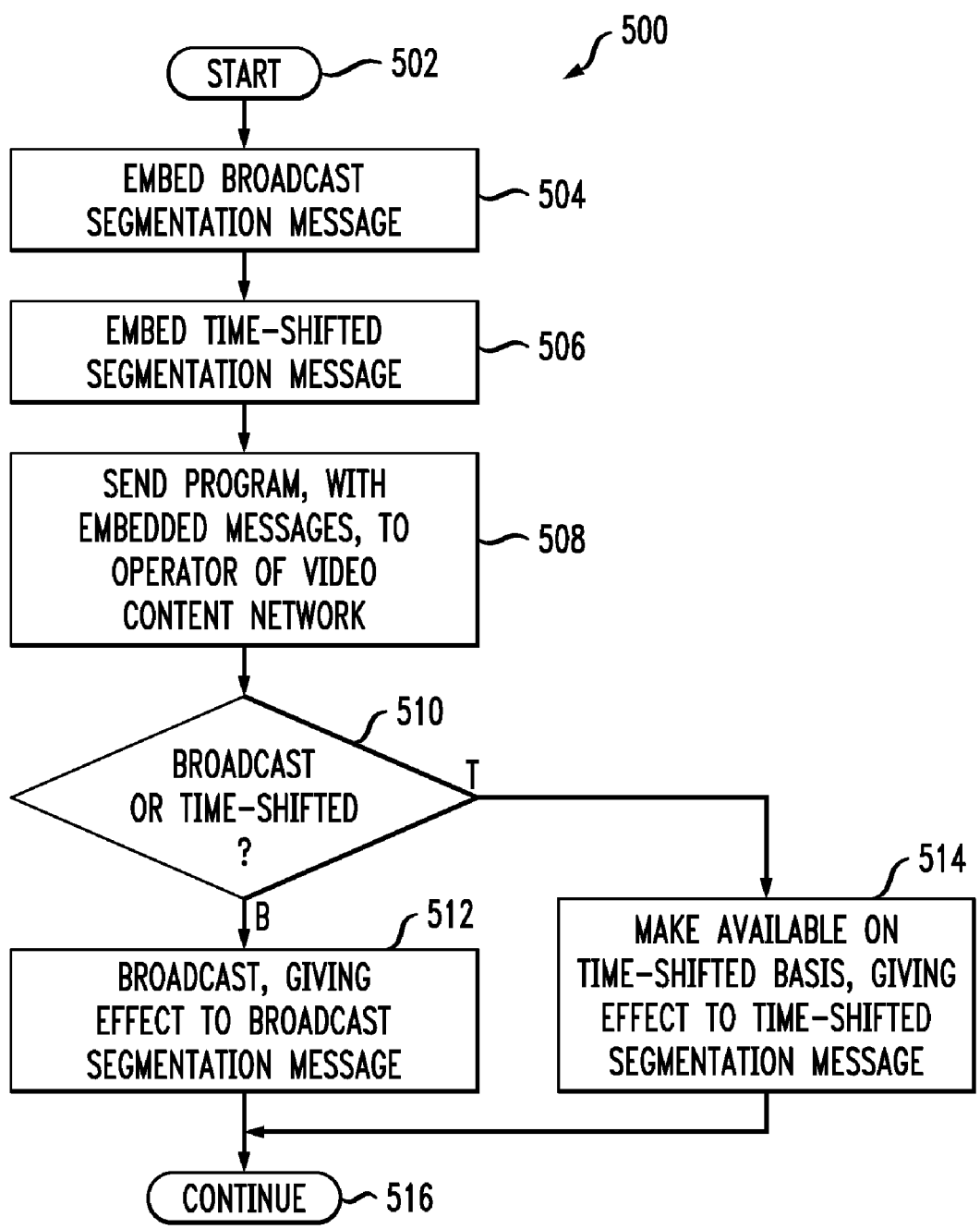
FIG. 5 is a flowchart of exemplary method steps, according to yet another aspect of the invention.

FIG. 5 shows a flow chart 500 of exemplary method steps, according to several aspects of the invention. After beginning at step 502, step 504 includes embedding, in a digital video program, at least one broadcast segmentation message specifying at least one location for at least one broadcast advertisement. Step 506 includes embedding, in the digital video program, at least one time-shifted segmentation message specifying at least one location for at least one time-shifted advertisement. Steps 504 and 506 are exemplary of a method that can be carried out, for example, by a source 12 using origination system 20. Optionally, step 508 includes sending the digital video program, with both the at least one broadcast segmentation message and the at least one time-shifted segmentation message embedded therein, to an operator of a video content network, such as cable system 14.

Step 508 is illustrative of one non-limiting manner in which the operator of the video content network can obtain a digital video program, the program including: (i) at least one broadcast segmentation message specifying at least one location for at least one broadcast advertisement, and (ii) at least one time-shifted segmentation message specifying at least one location for at least one time-shifted advertisement. Additional steps, which may be carried out, for example, by the operator of the video content network, include broadcasting the program with at least one broadcast advertisement in accordance with the at least one broadcast segmentation message; and making the program available to a subscriber at a time after the broadcasting, with at least one time-shifted advertisement in accordance with the at least one time-shifted segmentation message.

As described elsewhere herein, the broadcast segmentation message and the time-shifted segmentation message may conform to the American National Standards Institute and Society of Cable Telecommunications Engineers ANSI/SCTE 35 standard. The broadcast segmentation message and the time-shifted segmentation message may each have a message type field 404.

With regard to the step of broadcasting the program with at least one broadcast advertisement in accordance with the at least one broadcast segmentation message, one non-limiting example of accomplishing this step will now be given. As shown in decision block 510, if what is taking place is the initial broadcast ("B" branch), step 512 includes, responsive to the program being broadcast, giving effect to the at least one broadcast segmentation message, based on a value of the message type field indicating a broadcast type.

With regard to the step of making the program available to a subscriber at a time after the broadcasting, with at least one time-shifted advertisement in accordance with the at least one time-shifted segmentation message, one non-limiting example of accomplishing this step will now be given. As shown in decision block 510, if what is taking place is the time-shifted (e.g., start-over or NDVR) availability ("T" branch), step 514 includes, responsive to the program being made available to the subscriber at the time after the broadcasting, giving effect to the at least one time-shifted segmentation message, based on a value of the message type field indicating a time-shifted type.

In some instances, the at least one time-shifted segmentation message specifies a start time and an end time for the at least one time-shifted advertisement, while in other instances, the at least one time-shifted segmentation message is a first time-shifted segmentation message which specifies the start of the at least one time-shifted advertisement, and the program further includes a second time-shifted segmentation message specifying the end of the at least one time-shifted advertisement.

In one or more embodiments, in step 514, the at least one time-shifted advertisement is targeted. Non-limiting examples of such targeting include targeting based on calendar time (for example, broadcast ad airs in January and shows skiing; time-shifted ad in June shows picnic at the beach); targeting based viewer identity; targeting based on contents of the program (e.g., fan re-plays game several months later; it may be a good assumption to assume this person is a fan of the winning team and merchandise of the winning team may be offered in the time-shifted ad); and the like.

An optional additional step, not shown in FIG. 5, includes soliciting a source 12 of the digital video program to insert therein: (i) the at least one broadcast segmentation message specifying the at least one location for the at least one broadcast advertisement, and (ii) the at least one time-shifted segmentation message specifying the at least one location for the at least one time-shifted advertisement. Such solicitation might be carried out, for example, by a cable MSO.

The at least one time-shifted segmentation message may specify the at least one location for the at least one time-shifted advertisement at a location identical to the location for the at least one broadcast advertisement; in other instances, the at least one time-shifted segmentation message specifies the at least one location for the at least one time-shifted advertisement at a location different than the location for the at least one broadcast advertisement. In general, time-shifted ads can be at the same or different times than the broadcast ads; typical programs may have multiple ads and in some cases, some time-shifted ads are at the same time as the broadcast ads and some are at different times than the broadcast ads.

In one or more embodiments, in the obtaining step, the digital video program has the at least one broadcast advertisement embedded therein; while in other cases, the digital video program does not have the at least one broadcast advertisement embedded therein, and an additional step, not shown in FIG. 5, includes inserting the broadcast advertisement into the program (for example, by the cable MSO), in accordance with the at least one broadcast segmentation message.

In at least some embodiments, the at least one time-shifted segmentation message includes a business logic field 408 specifying business rules for the at least one time-shifted advertisement. Non-limiting examples of such rules include forbidding the at least one time-shifted advertisement to replace a corresponding broadcast advertisement, either permanently or for a pre-determined time period. In this latter example, when the time-shifted cue-tone is encountered, the original broadcast ad must be played in response, until the pre-determined time expires, after which a substitute ad can be inserted. A "corresponding" broadcast advertisement may include, for example, a broadcast advertisement in the same time as a time-shifted advertisement, or where times do not coincide exactly, that in the closest time slot.

Additional non-limiting examples of business rules include permitting the at least one time-shifted advertisement to replace a corresponding broadcast advertisement, provided that the at least one time-shifted advertisement is from a sponsor identical to that of the corresponding broadcast advertisement (e.g., two "Acme-Cola" ads); seasonal adjustment (e.g., "Acme-Cola" ski ad replaced with "Acme-Cola" beach party ad); and permitting the at least one time-shifted advertisement to replace a corresponding broadcast advertisement, provided that the at least one time-shifted advertisement is not adverse to business interests of a sponsor of the corresponding broadcast advertisement (e.g., "Acme-Cola" ad can be replaced with a variety of ads but not a "Zenith-Cola" ad).

The business rules may be specified as codes in the business logic field, with a corresponding look-up table. For example, code 1 means no replacement, code 2 means replace only with ad of same sponsor as corresponding broadcast ad, etc.

System and Article of Manufacture Details

Figure 6:
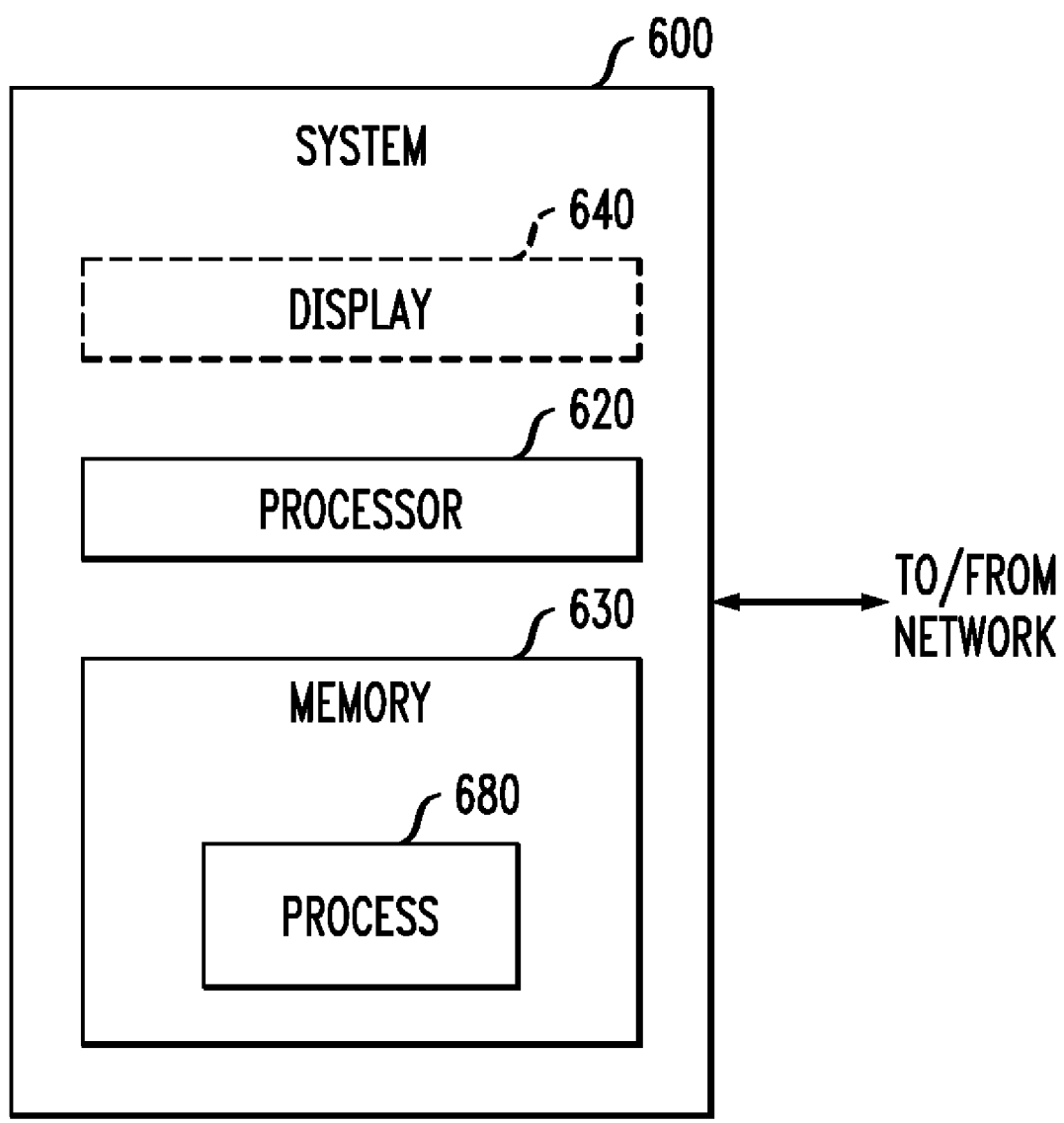
FIG. 6 is a block diagram of a computer system useful in connection with one or more aspects of the invention.

The invention can employ hardware and/or software aspects. Software includes but is not limited to firmware, resident software, microcode, etc. An exemplary embodiment of an inventive apparatus can include a memory and at least one processor coupled to the memory. The processor can be operative to facilitate performance of one or more of the method steps described herein. In another aspect, the apparatus can include means for performing the various method steps. The means can include one or more hardware modules, one or more software modules, or a mixture of one or more software modules and one or more hardware modules (appropriate interconnections via bus, network, and the like can also be included). One or more method steps of the present invention can be implemented in the form of an article of manufacture including a tangible machine readable storage medium that contains one or more programs that when executed implement such step or steps. FIG. 6 is a block diagram of a system 600 that can implement part or all of one or more aspects or processes of the present invention, processor 620 of which is representative of processors (such as those in elements or blocks 20, 103, 105, 107, 120, 155, 190) depicted in the other figures. In one or more embodiments, inventive steps are carried out by one or more of the processors in conjunction with one or more interconnecting network (s). As shown in FIG. 6, memory 630 configures the processor 620 to implement one or more aspects of the methods, steps, and functions disclosed herein (collectively, shown as process 680 in FIG. 6). The memory 630 could be distributed or local and the processor 620 could be distributed or singular. The memory 630 could be implemented as an electrical, magnetic or optical memory, or any combination of these or other types of storage devices. It should be noted that if distributed processors are employed, each distributed processor that makes up processor 620 generally contains its own addressable memory space. It should also be noted that some or all of computer system 600 can be incorporated into an application-specific or general-use integrated circuit. For example, one or more method steps could be implemented in hardware in an ASIC rather than using firmware. Display 640 is representative of a variety of possible input/output devices (e.g., displays, mice keyboards, and the like).

As is known in the art, part or all of one or more aspects of the methods and apparatus discussed herein may be distributed as an article of manufacture that itself includes a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed over multiple physical devices.

The computer systems and servers described herein each contain a memory that will configure associated processors to implement the methods, steps, and functions disclosed herein. Such methods, steps, and functions can be carried out, e.g., by processing capability on individual elements in the other figures, or by any combination thereof. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the present invention can make use of computer technology with appropriate instructions to implement method steps described herein.

Accordingly, it will be appreciated that one or more embodiments of the present invention can include a computer program including computer program code means adapted to perform one or all of the steps of any methods or claims set forth herein when such program is run on a computer, and that such program may be embodied on a computer readable medium. Further, one or more embodiments of the present invention can include a computer including code adapted to cause the computer to carry out one or more steps of methods or claims set forth herein, together with one or more apparatus elements or features as depicted and described herein.

Thus, aspects of the invention can be implemented, for example, by one or more appropriately programmed general purpose computers, such as, for example, servers. Such servers can be interconnected, for example, by one or more networks. The computers can be programmed, for example, in compiled, interpreted, object-oriented, assembly, and/or machine languages, for example, one or more of C, C++, Java, Visual Basic, and the like (an exemplary and non-limiting list), and can also make use of, for example, Extensible Markup Language (XML), known application programs, and the like. The computers can be programmed to implement the logic depicted in the flow charts.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
   obtaining, by an operator of a content network, from an external programming source, a digital video program, said program including: (i) at least one broadcast segmentation message, inserted therein by said external programming source, specifying at least one location for at least one broadcast advertisement, and (ii) at least one time-shifted segmentation message, of a different type than said broadcast segmentation message, inserted therein by said external programming source, specifying at least one location for at least one time-shifted advertisement;
   said operator of said content network broadcasting said program with at least one broadcast advertisement in accordance with said at least one broadcast segmentation message, while ignoring said at least one time-shifted segmentation message; and
   said operator of said content network making said program available to a subscriber at a time after said broadcasting, with at least one time-shifted advertisement in accordance with said at least one time-shifted segmentation message, while ignoring said at least one broadcast segmentation message.

2. The method of claim 1, wherein, in said obtaining step, said broadcast segmentation message and said time-shifted segmentation message conform to American National Standards Institute and Society of Cable Telecommunications Engineers ANSI/SCTE 35 standard.

3. The method of claim 1, wherein, in said obtaining step, said broadcast segmentation message and said time-shifted segmentation message each have a message type field, further comprising:
   responsive to said program being broadcast, said operator of said content network giving effect to said at least one broadcast segmentation message inserted therein by said external programming source, and ignoring said at least one time-shifted segmentation message, based on a value of said message type field indicating a broadcast type; and
   responsive to said program being made available to said subscriber at said time after said broadcasting, said operator of said content network giving effect to said at least one time-shifted segmentation message inserted therein by said external programming source, and ignoring said at least one broadcast segmentation message, based on a value of said message type field indicating a time-shifted type.

4. The method of claim 1, wherein said at least one time-shifted segmentation message specifies a start time and an end time for said at least one time-shifted advertisement.

5. The method of claim 1, wherein:
   said at least one time-shifted segmentation message comprises a first time-shifted segmentation message specifying a start of said at least one time-shifted advertisement; and
   said program further includes a second time-shifted segmentation message specifying an end of said at least one time-shifted advertisement.

6. The method of claim 1, wherein, in said step of making said program available to said subscriber at said time after said broadcasting, with said at least one time-shifted advertisement in accordance with said at least one time-shifted segmentation message, said at least one time-shifted advertisement is targeted.

7. The method of claim 6, wherein said at least one time-shifted advertisement is targeted based on calendar time.

8. The method of claim 6, wherein said at least one time-shifted advertisement is targeted based on viewer identity.

9. The method of claim 6, wherein said at least one time-shifted advertisement is targeted based on contents of said program.

10. The method of claim 1, further comprising the additional step of soliciting said external programming source of said digital video program to insert therein: (i) said at least one broadcast segmentation message specifying said at least one location for said at least one broadcast advertisement, and (ii) said at least one time-shifted segmentation message specifying said at least one location for said at least one time-shifted advertisement.

11. The method of claim 1, wherein said at least one time-shifted segmentation message specifies said at least one location for said at least one time-shifted advertisement at a location identical to said location for said at least one broadcast advertisement.

12. The method of claim 1, wherein said at least one time-shifted segmentation message specifies said at least one location for said at least one time-shifted advertisement at a location different than said location for said at least one broadcast advertisement.

13. The method of claim 1, wherein, in said obtaining step, said digital video program has said at least one broadcast advertisement embedded therein.

14. The method of claim 1, wherein, in said obtaining step, said digital video program does not have said at least one broadcast advertisement embedded therein, further comprising the additional step of inserting said broadcast advertisement therein, in accordance with said at least one broadcast segmentation message.

15. The method of claim 1, wherein said at least one time-shifted segmentation message comprises a business logic field specifying business rules for said at least one time-shifted advertisement.

16. The method of claim 15, wherein said business rules permanently forbid said at least one time-shifted advertisement replacing said broadcast advertisement.

17. The method of claim 15, wherein said business rules forbid said at least one time-shifted advertisement replacing said broadcast advertisement, for a pre-determined time period.

18. The method of claim 15, wherein said business rules permit said at least one time-shifted advertisement to replace said broadcast advertisement, provided that said at least one time-shifted advertisement is from a sponsor identical to that of said broadcast advertisement.

19. The method of claim 18, wherein said at least one time-shifted advertisement is seasonally adjusted.

20. The method of claim 15, wherein said business rules permit said at least one time-shifted advertisement to replace said broadcast advertisement, provided that said at least one time-shifted advertisement is not adverse to business interests of a sponsor of said broadcast advertisement.

21. The method of claim 15, wherein said business rules are specified as codes in said business logic field, with a corresponding look-up table.

22. A method comprising the steps of:
embedding, in a digital video program, by a programming source external to a content network, at least one broadcast segmentation message specifying at least one location for at least one broadcast advertisement, said at least one broadcast segmentation message specifying that it is to be given effect by an operator of a content network during broadcast of said digital video program and ignored when said digital video program is to be made available to a subscriber of said content network after said broadcast;
embedding, in said digital video program, by said programming source external to said content network, at least one time-shifted segmentation message specifying at least one location for at least one time-shifted advertisement, said at least one time-shifted segmentation message being of a different type than said broadcast segmentation message, said type specifying that said at least one time-shifted segmentation message is to be ignored by said operator of said content network during said broadcast of said digital video program and given effect when said digital video program is to be made available to said subscriber of said content network after said broadcast; and
sending said digital video program, from said programming source external to said content network, with both:
(i) said at least one broadcast segmentation message specifying said at least one location for said at least one broadcast advertisement, and
(ii) said at least one time-shifted segmentation message specifying said at least one location for said at least one time-shifted advertisement,
embedded therein, to said operator of said content network.

23. A system comprising:
a memory; and
at least one processor, coupled to said memory, and operative to:
obtain, at a facility of an operator of a content network, from an external programming source, a digital video program, said program including: (i) at least one broadcast segmentation message, inserted therein by said external programming source, specifying at least one location for at least one broadcast advertisement, and (ii) at least one time-shifted segmentation message, of a different type than said broadcast segmentation message, inserted therein by said external programming source, specifying at least one location for at least one time-shifted advertisement;
broadcast said program, from said facility of said operator of said content network, over said content network, with at least one broadcast advertisement in accordance with said at least one broadcast segmentation message, while ignoring said at least one time-shifted segmentation message; and
make said program available to a subscriber at a time after said broadcasting, from said facility of said operator of said content network, over said content network, with at least one time-shifted advertisement in accordance with said at least one time-shifted segmentation message, while ignoring said at least one broadcast segmentation message.

24. A system comprising:
a memory; and
at least one processor, coupled to said memory, and operative to:
embed, in a digital video program, at a program source external to a content network, at least one broadcast segmentation message specifying at least one location for at least one broadcast advertisement, said at least one broadcast segmentation message specifying that it is to be given effect by an operator of a content network during broadcast of said digital video program and ignored when said digital video program is to be made available to a subscriber of said content network after said broadcast;
embed, in said digital video program, at said program source external to said content network, at least one time-shifted segmentation message specifying at least one location for at least one time-shifted advertisement, said at least one time-shifted segmentation message being of a different type than said broadcast segmentation message, said type specifying that said at least one time-shifted segmentation message is to be ignored by said operator of said content network during said broadcast of said digital video program and given effect when said digital video program is to be made available to said subscriber of said content network after said broadcast; and
send said digital video program, from said programming source external to said content network, with both:
(i) said at least one broadcast segmentation message specifying said at least one location for said at least one broadcast advertisement, and
(ii) said at least one time-shifted segmentation message specifying said at least one location for said at least one time-shifted advertisement,
embedded therein, to said operator of said content network.

25. A system comprising:
means for obtaining, by an operator of a content network, from an external programming source, a digital video program, said program including: (i) at least one broadcast segmentation message, inserted therein by said external programming source, specifying at least one location for at least one broadcast advertisement, and (ii) at least one time-shifted segmentation message, of a different type than said broadcast segmentation message, inserted therein by said external programming source, specifying at least one location for at least one time-shifted advertisement;
means for said operator of said content network broadcasting said program with at least one broadcast advertisement in accordance with said at least one broadcast segmentation message, while ignoring said at least one time-shifted segmentation message; and
means for said operator of said content network making said program available to a subscriber at a time after said broadcasting, with at least one time-shifted advertisement in accordance with said at least one time-shifted segmentation message, while ignoring said at least one broadcast segmentation message;

wherein each of said means comprise at least one of:
- a hardware module; and
- a software module, tangibly embodied in a non-transitory manner on a tangible, computer-readable, recordable storage medium, and executing on at least one hardware processor.

26. A system comprising:

means for embedding, in a digital video program, by a programming source external to a content network, at least one broadcast segmentation message specifying at least one location for at least one broadcast advertisement, said at least one broadcast segmentation message specifying that it is to be given effect by an operator of a content network during broadcast of said digital video program and ignored when said digital video program is to be made available to a subscriber of said content network after said broadcast;

means for embedding, in said digital video program, by said programming source external to said content network, at least one time-shifted segmentation message specifying at least one location for at least one time-shifted advertisement, said at least one time-shifted segmentation message being of a different type than said broadcast segmentation message, said type specifying that said at least one time-shifted segmentation message is to be ignored by said operator of said content network during said broadcast of said digital video program and given effect when said digital video program is to be made available to said subscriber of said content network after said broadcast; and means for sending said digital video program, from said programming source external to said content network, with both:
- (i) said at least one broadcast segmentation message specifying said at least one location for said at least one broadcast advertisement, and
- (ii) said at least one time-shifted segmentation message specifying said at least one location for said at least one time-shifted advertisement, embedded therein, to said operator of said content network;

wherein each of said means comprise at least one of:
- a hardware module; and
- a software module, tangibly embodied in a non-transitory manner on a tangible, computer-readable, recordable storage medium, and executing on at least one hardware processor.

* * * * *